(12) United States Patent
Chang

(10) Patent No.: US 7,327,703 B2
(45) Date of Patent: Feb. 5, 2008

(54) METHOD FOR PROVIDING CONCURRENT SERVICE IN A MOBILE COMMUNICATION SYSTEM

(75) Inventor: Yong Chang, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 1386 days.

(21) Appl. No.: 09/808,756

(22) Filed: Mar. 15, 2001

(65) Prior Publication Data
US 2001/0038615 A1 Nov. 8, 2001

(30) Foreign Application Priority Data
Mar. 15, 2000 (KR) ................. 2000-13146
May 16, 2000 (KR) ................. 2000-27160

(51) Int. Cl.
*H04Q 7/00* (2006.01)
*H04L 12/28* (2006.01)
(52) U.S. Cl. ............ 370/329; 370/239; 370/401; 370/412; 370/522
(58) Field of Classification Search ............. 370/229, 370/329, 412, 468, 341, 344, 401, 437, 239, 370/522, 238; 379/100.15, 93.09, 93.17, 379/93.33; 358/442, 425, 434–436; 455/560; 348/14.13
See application file for complete search history.

(56) References Cited

U.S. PATENT DOCUMENTS

| 5,359,644 A | * | 10/1994 | Tanaka et al. ............ 379/93.17 |
| 5,487,175 A | | 1/1996 | Bayley et al. |
| 5,590,406 A | | 12/1996 | Bayley et al. |
| 5,757,792 A | | 5/1998 | Aoki |
| 5,854,830 A | * | 12/1998 | Kenmochi ............. 379/100.15 |
| 6,144,647 A | * | 11/2000 | Lopez-Torres ............. 370/329 |

FOREIGN PATENT DOCUMENTS

| WO | WO 99/49677 | 9/1999 |
| WO | WO 99/53704 | 10/1999 |
| WO | WO 01/13669 | 2/2001 |

OTHER PUBLICATIONS

European Search Report dated Apr. 2, 2003 issued in a counterpart application, namely, Appln. No. 01912560.8.
Steve Dennett: "The CDMA 2000 ITU-R RTT Candidate Submission (0.18)", Telecommunications Industry Association (TIA), Jul. 27, 1998.

\* cited by examiner

*Primary Examiner*—Afsar Qureshi
(74) *Attorney, Agent, or Firm*—The Farrell Law Firm, PC

(57) ABSTRACT

There is provided a method for setting and clearing a concurrent service between a mobile switching center (MSC) and a base station, to provide a new service while providing an existing service. The base station forms a signaling link for a first service between the base station and the MSC. Upon receipt of a service request signal for a second service from a packet data service network (PDSN) while providing the first service, the base station sends a resource assignment request for the second service to the MSC through the formed signaling link. The MSC then sends a resource assignment approval signal to the base station through the formed signaling link.

8 Claims, 23 Drawing Sheets

| 7 | 6 | 5 | 4 | 3 | 2 | 1 | 0 | Octet |
|---|---|---|---|---|---|---|---|---|
| \multicolumn{8}{c}{BSMAP Header: Message Discrimination=[00H]} | 1 |
| Length Indicator(LI)=<variable> ||||||||| 2 |
| Message Type= ||||||||| 1 |
| Mobile Identity(IMSI): Length=[06H-08H](10-15digits) ||||||||| 1 |
| Identity Digit 1=[0H-9H](BCD) |||| Odd/even Indicator =[1,0] || Type of Identity =[110] (IMSI) ||| 2 |
| Identity Digit 3=[0H-9H](BCD) |||| Identity Digit 2=[0H-9H](BCD) |||| 3 |
| . . . ||||||||| |
| Identity Digit N+1=[0H-9H](BCD) |||| Identity Digit N=[0H-9H](BCD) |||| n |
| =[1111](if even number of digits) |||| Identity Digit N+2=[0H-9H](BCD) |||| n+1 |
| Mobile Identity(ESN): A1 Element Identifier=[0DH] ||||||||| 1 |
| Length=[05H] ||||||||| 2 |
| Identity Digit 1=[0000] |||| Odd/even Indicator =[0] || Type of Identity =[101] (ESN) ||| 3 |
| (MSB) ||||||||| 4 |
| ESN=<any value> ||||||||| 5 |
| ||||||||| 6 |
| (LSB) ||||||||| 7 |
| Service Option: A1 Element Identifier=[03H] ||||||||| 1 |
| (MSB) Service Option= ||||||||| 2 |
| (LSB) ||||||||| 3 |

FIG. 7

| Information Element |
| --- |
| Protocol Discriminator |
| Reserved – Octet |
| Message Type |
| CM Service Type |
| Mobile Identity(IMSI) |
| Called Party BCD Number |
| Mobile Identity(ESN) |
| Service Option |
| Voice Privacy Request |
| Radio Environment and Resources |
| Called Party ASCII Number |
| Circuit Identity Code |

FIG. 8

| 7 | 6 | 5 | 4 | 3 | 2 | 1 | 0 | Octet |
|---|---|---|---|---|---|---|---|---|
| colspan=8 | DTAP Header: Message Discrimination=[01H] | | | | | | | 1 |
| colspan=8 | Data Link Connection Identifier(DLCI) | | | | | | | 2 |
| colspan=8 | Length Indicator(LI) | | | | | | | 3 |
| Reserved=[0000] | | | | Protocol Discriminator (Call Processing including Concurrent Service processing & Supplementary Services) | | | | 1 |
| colspan=8 | Reserved-Octet=[00H] | | | | | | | 1 |
| colspan=8 | Message Type=[24H] | | | | | | | 1 |
| CM Service Type: A1 Element Identifier | | | | Service Type | | | | 1 |
| colspan=8 | Mobile Identity(IMSI):Length=[06H-08H](10-15digits) | | | | | | | 1 |
| Identity Digit 1=[0H-9H](BCD) | | | | Odd/even Indicator =[1,0] | Type of Identity =[110] (IMSI) | | | 2 |
| Identity Digit 3=[0H-9H](BCD) | | | | Identity Digit 2=[0H-9H](BCD) | | | | 3 |
| ... | | | | | | | | ... |
| Identity Digit N+1=[0H-9H](BCD) | | | | Identity Digit N=[0H-9H](BCD) | | | | n |
| =[1111](if even number of digits) | | | | Identity Digit N+2=[0H-9H](BCD) | | | | n+1 |
| colspan=8 | Called Party BCD Number: A1 Element Identifier=[5EH] | | | | | | | 1 |
| colspan=8 | Length=[00H-11H] | | | | | | | 2 |
| =[1] | Type of Number =[000-111] | | | Number Plan Identification =[0000-1111] | | | | 3 |
| Number Digit/End Mark 2=[0000-1111] | | | | Number Digit/End Mark 1=[0000-1111] | | | | 4 |
| Number Digit/End Mark 4=[0000-1111] | | | | Number Digit/End Mark 3=[0000-1111] | | | | 5 |
| ... | | | | | | | | ... |
| Number Digit/End Mark m+1=[0000-1111] | | | | Number Digit/End Mark m=[0000-1111] | | | | n |

FIG. 9A

| 7 | 6 | 5 | 4 | 3 | 2 | 1 | 0 | Octet |
|---|---|---|---|---|---|---|---|---|
| colspan="8" | Mobile Identity(ESN): A1 Element Identifier=[0DH] | 1 |
| colspan="8" | Length=[05H] | 2 |
| colspan="4" | Identity Digit 1=[0000] | Odd/even Indicator =[0] | colspan="3" | Type of Identity =[101] (ESN) | 3 |
| (MSB) | colspan="7" | | 4 |
| colspan="8" | ESN=<any value> | 5 |
| | | 6 |
| colspan="7" | | (LSB) | 7 |
| colspan="8" | Service Option: A1 Element Identifier=[03H] | 1 |
| (MSB) | colspan="7" | Service Option=<any value> | 2 |
| colspan="7" | | (LSB) | 3 |
| colspan="8" | Voice Privacy Request: A1 Element Identifier=[A1H] | 1 |
| colspan="8" | Radio Environment and Resources: A1 Element Identifier=[1DH] | 1 |
| Reserved=[0] | Include Priority =[0,1] | colspan="2" | Forward=[00] | colspan="2" | Reverse=[00] | Alloc= [0,1] | Avail= [0,1] | 2 |
| colspan="8" | Called Party ASCII Number: A1 Element Identifier=[5BH] | 1 |
| colspan="8" | Length=<variable> | 2 |
| ext=[1] | colspan="3" | Type of Number=[000-111] (as in T1.607 sec 4.5.9) | colspan="4" | Number Plan Identification=[0000-1111] (as in T1.607 sec 4.5.9) | 3 |
| colspan="8" | ASCII character 1 | 4 |
| colspan="8" | ASCII character 2 | 5 |
| colspan="8" | . . . | . . . |
| colspan="8" | ASCII character n | n |
| colspan="8" | Circuit Identity Code: A1 Element Identifier=[01H] | 1 |
| (MSB) | colspan="7" | PCM Multiplexer=<any value> | 2 |
| colspan="2" | (LSB) | colspan="5" | Timeslot=[00000-11111] | 3 |

FIG. 9B

| INFORMATION ELEMENT |
| --- |
| MESSAGE TYPE |
| CAUSE |
| SERVICE OPTION CONNECTION REFERENCE |
| CAUSE LAYER 3 |

FIG. 12

| 7 | 6 | 5 | 4 | 3 | 2 | 1 | 0 | Octet |
|---|---|---|---|---|---|---|---|---|
| colspan="8" | BSMAP HEADER: MESSAGE DISCRIMINATION = [xxH] | 1 |
| colspan="8" | LENGTH INDICATOR (LI) = [xxH] | 2 |
| colspan="8" | MESSAGE TYPE = [xxH] | 1 |
| colspan="8" | CAUSE: A1 ELEMENT IDENTIFIER = [04H] | 1 |
| colspan="8" | LENGTH = [01H] | 2 |
| ext=[0] | colspan="7" | CAUSE VALUE = [00H(RADIO INTERFACE MESSAGE FAILURE), 01H(RADIO INTERFACE FAILURE), 07H (OAM&P INTERVENTION), 09H (CALL PROCESSING INCLUDING CONCURRENT SERVICE PROCESSING), 10H(PACKET CALL GOING DORMANT), 0DH(TIMER EXPIRED), 20H(EQUIPMENT FAILURE) 60H(PROTOCOL ERROR BETWEEN BS AND MSC) 72H(MS-TO-IWF TCP CONNECTION FAILURE), 73H(ATHO(MODEM HANG UP)COMMAND), 74H(+FSH/+FHNG(FAX SESSION ENDED)COMMAND), 75H(NO CARRIER) 76H(PPP PROTOCOL FAILURE), 77H(PPP SESSION CLOSED BY THE MS) ] | 3 |

FIG. 13A

| SERVICE OPTION CONNECTION REFERENCE: A1 ELEMENT IDENTIFIER=[xxH] | | 1 |
|---|---|---|
| LENGTH=[07H] | | 2 |
| RESERVED=[0000000] | SOC_N UM=0 | 3 |
| (MSB) SERVICE OPTION 1 | | 4 |
| =[8000H(13K SPEECH),<br>0011H(13K HIGH RATE VOICE SERVICE),<br>0003H(EVRC),<br>801FH(13K MARKOV),<br>0009H(13KK LOOPBACK),<br>0004H(Async DATA RATE Set 1),<br>0005H(G3 FAX RATE Set 1),<br>000CH(Async DATA RATE Set 2,)<br>000DH(G3 FAX RATE Set 2),<br>0006H(SMS RATE Set 1),<br>000EH(SMS RATE Set 2),<br>0021H(PACKET DATA),<br>0012H(OTAPA RATE Set 1),<br>0013H(OTAPA RATE Set 2) ] | (LSB) | 5 |
| (MSB) | | 6 |
| SERVICE OPTION 1 CONNECTION REFERENCE=<ANY VALUE> | | 7 |
| | | 8 |
| | (LSB) | 9 |
| CAUSE LAYER 3: A1 ELEMENT IDENTIFIER = [08H] | | 1 |
| LENGTH = [02H] | | 2 |
| ext=[1] | CODING STANDARD =[00](Q.931) | RESERVED =[0] | LOCATION = [0100] (PUBLIC NETWORK SERVING THE REMOTE USER) | 3 |
| ext=[1] | CAUSE VALUE = [10H (NORMAL CLEARING), 1FH(NORMAL UNSPECIFIED)] | 4 |

FIG. 13B

| INFORMATION ELEMENT |
| --- |
| MESSAGE TYPE |
| CAUSE |
| SERVICE OPTION CONNECTION REFERENCE |
| CAUSE LAYER 3 |

FIG. 14

| 7 | 6 | 5 | 4 | 3 | 2 | 1 | 0 | Octet |
|---|---|---|---|---|---|---|---|---|
| BSMAP HEADER: MESSAGE DISCRIMINATION = [xxH] ||||||||  1 |
| LENGTH INDICATOR (LI) = [xxH] ||||||||  2 |
| MESSAGE TYPE = [xxH] ||||||||  1 |
| CAUSE: A1 ELEMENT IDENTIFIER = [04H] ||||||||  1 |
| LENGTH = [01H] ||||||||  2 |
| ext=[0] | CAUSE VALUE = [00H(RADIO INTERFACE MESSAGE FAILURE), 01H(RADIO INTERFACE FAILURE), 07H (OAM & P INTERVENTION), 09H (CALL PROCESSING INCLUDING CONCURRENT SERVICE PROCESSING), 10H(PACKET CALL GOING DORMANT), 0DH(TIMER EXPIRED), 20H(EQUIPMENT FAILURE) 60H(PROTOCOL ERROR BETWEEN BS AND MSC) 72H(MS-TO-IWF TCP CONNECTION FAILURE), 73H(ATHO(MODEM HANG UP)COMMAND), 74H(+FSH/+FHNG(FAX SESSION ENDED)COMMAND), 75H(NO CARRIER) 76H(PPP PROTOCOL FAILURE), 77H(PPP SESSION CLOSED BY THE MS) ] ||||||| 3 |

FIG. 15A

| | |
|---|---|
| SERVICE OPTION   CONNECTION REFERENCE: A1 ELEMENT IDENTIFIER=[xxH] | 1 |
| LENGTH=[07H] | 2 |
| RESERVED=[0000000]   SOC_N UM=0 | 3 |
| (MSB)   SERVICE OPTION 1 | 4 |
| =[8000H(13K SPEECH), 0011H(13K HIGH RATE VOICE SERVICE), 0003H(EVRC), 801FH(13K MARKOV), 0009H(13K LOOPBACK), 0004H(Async DATA RATE Set 1), 0005H(G3 FAX RATE Set 1), 000CH(Async DATA RATE Set 2,) 000DH(G3 FAX RATE Set 2), 0006H(SMS RATE Set 1), 000EH(SMS RATE Set 2), 0021H(PACKET DATA), 0012H(OTAPA RATE Set 1), 0013H(OTAPA RATE Set 2) ]   (LSB) | 5 |
| (MSB) | 6 |
| SERVICE OPTION 1 CONNECTION REFERENCE=<ANY VALUE> | 7 |
|  | 8 |
| (LSB) | 9 |
| CAUSE LAYER 3:   A1 ELEMENT IDENTIFIER = [08H] | 1 |
| LENGTH = [02H] | 2 |
| ext=[1] | CODING STANDARD =[00](Q.931) | RESERVED =[0] | LOCATION = [0100] (PUBLIC NETWORK SERVING THE REMOTE USER) | 3 |
| ext=[1] | CAUSE VALUE = [10H (NORMAL CLEARING), 1FH(NORMAL UNSPECIFIED)] | 4 |

FIG. 15B

| 7 | 6 | 5 | 4 | 3 | 2 | 1 | 0 | Octet |
|---|---|---|---|---|---|---|---|---|
| BSMAP HEADER: MESSAGE DISCRIMINATION = [00H] | | | | | | | | 1 |
| LENGTH INDICATOR (LI) = [01H] | | | | | | | | 2 |
| MESSAGE TYPE = [xxH] | | | | | | | | 1 |

METHOD FOR PROVIDING CONCURRENT SERVICE IN A MOBILE COMMUNICATION SYSTEM

PRIORITY

This application claims priority to an application entitled "Method for Providing Concurrent Service in a Mobile Communication System" filed in the Korean Industrial Property Office on Mar. 15, 2000 and assigned Serial No. 2000-13146; and an application entitled "BSS and MSC of a Mobile Communication System for a concurrent service setting and the method therefor" filed in Korean Industrial Property Office on 16 May 2000 and assigned Serial No. 2000-27160, the contents of both of which are hereby incorporated by reference.

BACKGROUND OF THE INVENTION

1. Field of the Invention

The present invention relates generally to a mobile communication system, and in particular, to a method for concurrently providing a voice service and a packet service.

2. Description of the Related Art

In general, a CDMA (Code Division Multiple Access) mobile communication system cannot concurrently provide two difference services in an active state. That is, an existing mobile communication system provides only one of the voice service and the packet service, and rejects a newly requested service, which is different from the currently provided service.

FIG. 1 illustrates the stricture of a common mobile communication system. More specifically, FIG. 1 illustrates a reference model of a 3G IOS ($3^{rd}$ Generation Interoperability Specifications) for a digital air interface between a mobile switching center (MSC) and a base station (BS), and between the base station and a mobile station (MS).

Referring to FIG. 1, the mobile communication system includes a mobile switching center (MSC) 10, base stations (BS) 30 and 40 and a packet data service node or network (PDSN) 60. An interworking function (IWF) block 20 is connected to the mobile switching center 10, and a packet control function (PCF) block 50 is interconnected between the base station 30 and the PDSN 60. The mobile switching center 10 includes a call control and mobility management block 12 and a switch function block 14. The base station 30 is a source base station and the base station 40 is a target base station. The base stations 30 and 40 include base station controllers (BSCs) 32 and 42, and base station transceiver subsystem (BTSs) 34 and 44, respectively. The base station controller 32 includes an SDU (Service Data Unit) function block. The base station transceiver subsystems 34 and 44 are wirelessly connected to the mobile stations (not shown). The mobile stations are connected to the mobile switching center 10 via the base station 30 to be provided with the voice service, and connected to the PDSN 60 via the base station 30 to be provided with the packet service.

Signaling data between the mobile switching center 10 and the base station controller 32 is defined as an A1 interface, and user data (or traffic) therebetween is defined as A2/A5 (circuit data only) interfaces. An A3 interface is for a soft/softer handoff between the base stations, and is defined to attach signaling data and user data to a frame selection function of the target base station 40 and the source base station 30. An A7 interface is also for the soft/softer handoff between the base stations, and is defined for the signaling data between the target base station 40 and the source base station 30. A8/A9 interfaces are used to transmit user data and signaling data between the base station 30 and the PCF block 50, respectively. A10 and A11 interfaces are used to transmit user data and signaling data between the PCF block 50 and the PDSN 60, respectively.

In the CDMA system of FIG. 1, wired communication links between the base stations 30 and 40, and between the base station 30 and the mobile switching center 10 include a forward link for transmitting signals from the mobile switching center 10 to the base station 30, a reverse link for transmitting signals from the base station 30 to the mobile switching center 10, and a link between the base station 30 and the base station 40. A mobile station (not shown) connected to the base station transceiver subsystem 34 in the base station 30 is connected to the mobile switching center 10 via the base station 30 to be provided with the voice service, and connected to the PDSN 60 via the base station 30 to be provided with the packet service.

FIG. 2 illustrates a procedure for managing a new service requested while providing an existing (or current) service in the conventional mobile communication system. This procedure is performed in the mobile switching center 10 of the mobile communication system.

Referring to FIG. 2, upon receipt of a new service request, the mobile switching center 10 of FIG. 1 receives the new service request in step S10, and determines in step S11 whether an existing service (or a presently connected service) is connected to a receiving/origination-requested mobile station. If it is determined that the existing service is not connected to the receiving/origination-requested mobile station, the mobile switching center 10 connects the newly requested service to the receiving/origination-requested mobile station in step S12.

Otherwise, if it is determined that the existing service is connected to the receiving/origination-requested mobile station, the mobile switching center 10 determines in step S13 whether the presently connected service is the packet service or not. If the presently connected service is the packet service, the mobile switching center 10 determines in step S14 whether the packet service is in a dormant state. If the packet service is in the dormant state, the mobile switching center 10 proceeds to step S12 and connects the newly requested service to the receiving/origination-requested mobile station.

If the presently connected service is not the packet service in step S13, i.e., if the presently connected service is the voice service or an emergency call service, the mobile switching center 10 proceeds to step S15. The mobile switching center 10 also proceeds to step S15, when the presently connected service is the packet service and the packet service is not in the dormant state in step S14 but in an active state. In step S15, the mobile switching center 10 refuses the newly requested service.

FIG. 3 illustrates a procedure for clearing a presently provided service in the conventional mobile communication system. This procedure is also performed in the mobile switching center 10 of FIG. 1.

Referring to FIG. 3, upon receipt of a service clear (or release) request from an external network (not shown) via the base station 30 or the IWF block 20 of FIG. 1 in step S20, the mobile switching center 10 determines the clear-requested service (i.e., the service to be cleared) and the associated mobile station in step S21. Thereafter, in step S22, the mobile switching center 10 sends a clear command message to the base station 30 (or 40) to clear the service of the corresponding mobile station. Upon failure to receive a clear complete message from the base station 30 within a predetermined time, the mobile switching center 10 repeats to sending a clear command message in step S22. Upon receipt of the clear complete message from the base station 30 in step S24, the mobile switching center 10 clears the service for the corresponding mobile station. That is, in step S24, the mobile switching center 10 clears entire information (e.g., service option and temporary user location information) related to the wire connection and the service connected to the corresponding mobile station.

Accordingly, if the existing service is the packet service and the packet service is in the dormant state, the conventional mobile communication system can provide the newly requested service such as the voice service. However, if the existing service is the activated packet service or the voice service, the conventional mobile communication system cannot provide the newly requested service.

SUMMARY OF THE INVENTION

It is, therefore, an object of the present invention to provide a method for providing a newly requested service, which is different from a presently provided service in a mobile communication system.

To achieve the above and other objects, there is provided a method for setting and clearing a concurrent service between a mobile switching center (MSC) and a base station, to provide a new service while providing an existing service. The base station forms a signaling link for a first service between the base station and the MSC. Upon receipt of a service request signal for a second service from a packet data service network (PDSN) while providing the first service, the base station sends a resource assignment request for the second service to the MSC through the formed signaling link. The MSC then sends a resource assignment approval signal to the base station through the formed signaling link.

BRIEF DESCRIPTION OF THE DRAWINGS

The above and other objects, features and advantages of the present invention will become more apparent from the following detailed description when taken in conjunction with the accompanying drawings in which:

FIG. 7 is a table diagram illustrating a bit map layout of the enhanced service request message shown in FIG. 6;

FIG. 8 is a diagram illustrating a format of an enhanced service connect required message transmitted from the base station to the mobile switching center according to an embodiment of the present invention;

FIGS. 9A and 9B are table diagrams illustrating a bit map layout of the enhanced service connect required message shown in FIG. 8;

FIG. 12 is a diagram illustrating a format of a service clear request message transmitted from the base station to the mobile switching center according to an embodiment of the present invention;

FIGS. 13A and 13B are table diagrams illustrating a bit map layout of the service clear request message shown in FIG. 12;

FIG. 14 is a diagram illustrating a format of a service clear command message transmitted from the mobile switching center to the base station according to an embodiment of the present invention;

FIGS. 15A and 15B are table diagrams illustrating a bit map layout of the service clear command message shown in FIG. 14;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
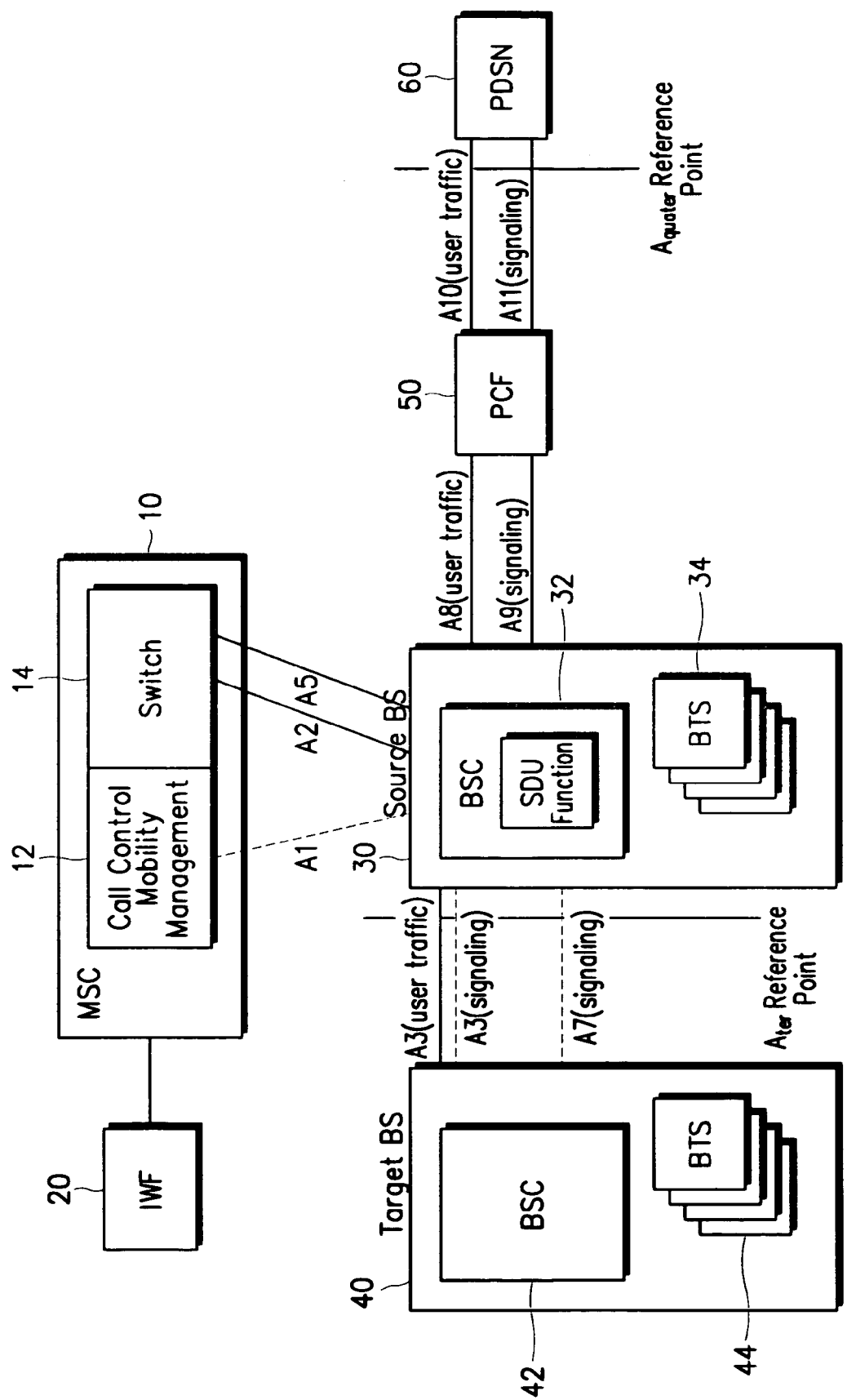
FIG. 1 is a diagram illustrating a reference model of a 3G IOS for a digital air interface between a mobile switching center and a base station, and between one base station and another base station in a conventional mobile communication system.
Figure 2:
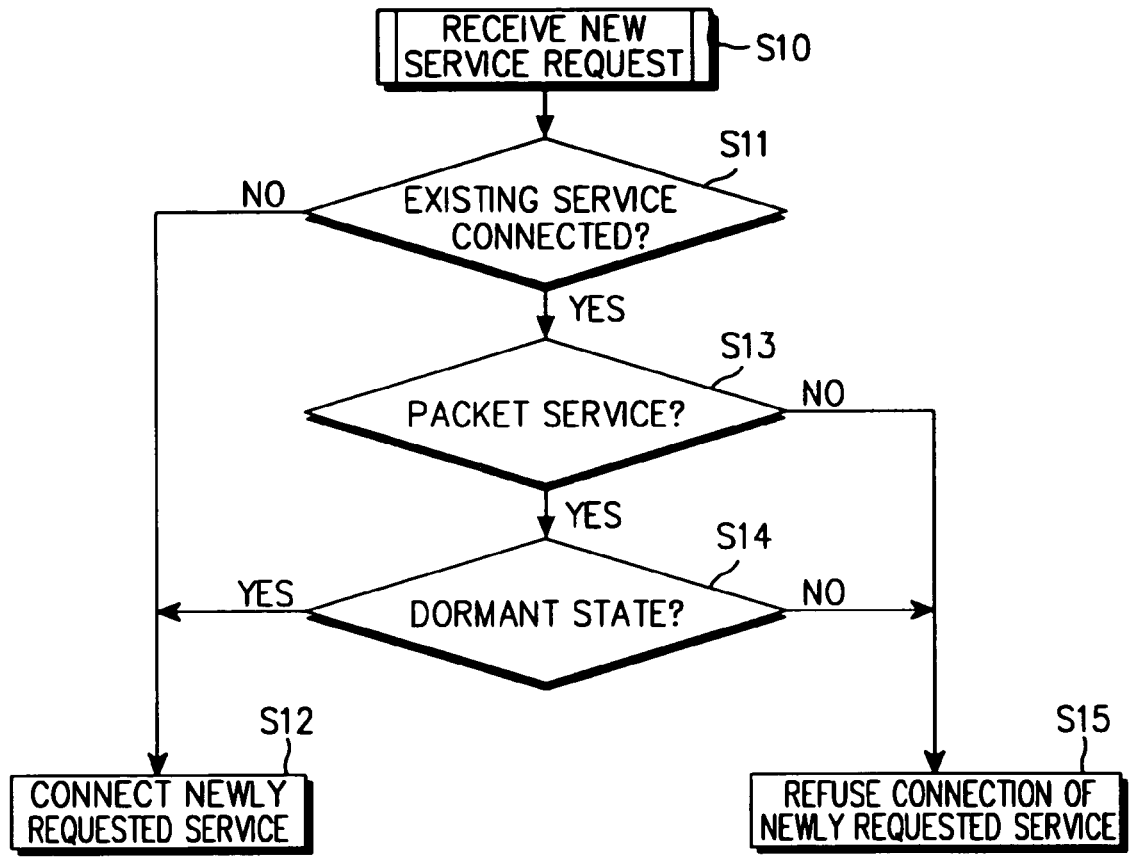
FIG. 2 is a flow chart illustrating a procedure for managing a new service requested while providing an existing service in the conventional mobile communication system.
Figure 3:
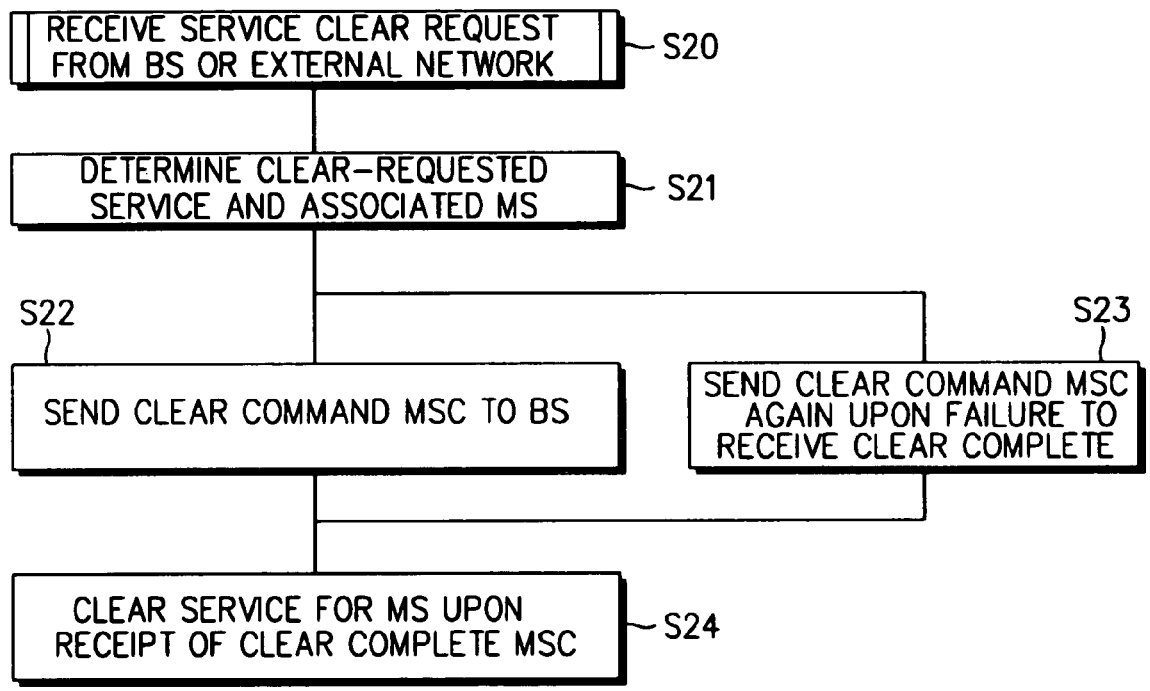
FIG. 3 is a flow chart illustrating a procedure for clearing a presently provided service in the conventional mobile communication system.

Now, a description will be made of operations of setting and clearing a concurrent (or enhanced) service according to an embodiment of the present invention. Such operations are performed in the mobile communication system of FIG. 1, including a mobile station, a base station in communication with the mobile station, a mobile switching center (MSC) connected to the base station, and a packet data service node or network (PDSN) connected to the base station. A first service (e.g., a voice service) is provided between the mobile terminal and the mobile switching center, and a second service (e.g., a packet service) is provided between the mobile station and the PDSN. The concurrent service setting operation will be described with reference to FIGS. 4 to 9B, and the concurrent service clearing operation will be described with reference to FIGS. 10 to 17. In establishment and clearance of the concurrent service, which will be given hereinbelow, a signal control link, i.e., SCCP (Signaling Connection Control Part), is formed between the MSC and the base station. Relative to such a signal control link forming and judgement of the link forming, which relate to FIGS. 4 and 10, it will be explained that the MSC performs the above operation. However, it should be noted that the base station may perform the operation based on a position requiring addition or clearing of the concurrent service. For example, when the addition or clearing of the concurrent service is required in a mobile station or PDSN, it may be preferable that the base station judges whether the signal control link is formed or not and forms the link.

A. Concurrent Service Setting Operation

Figure 4:
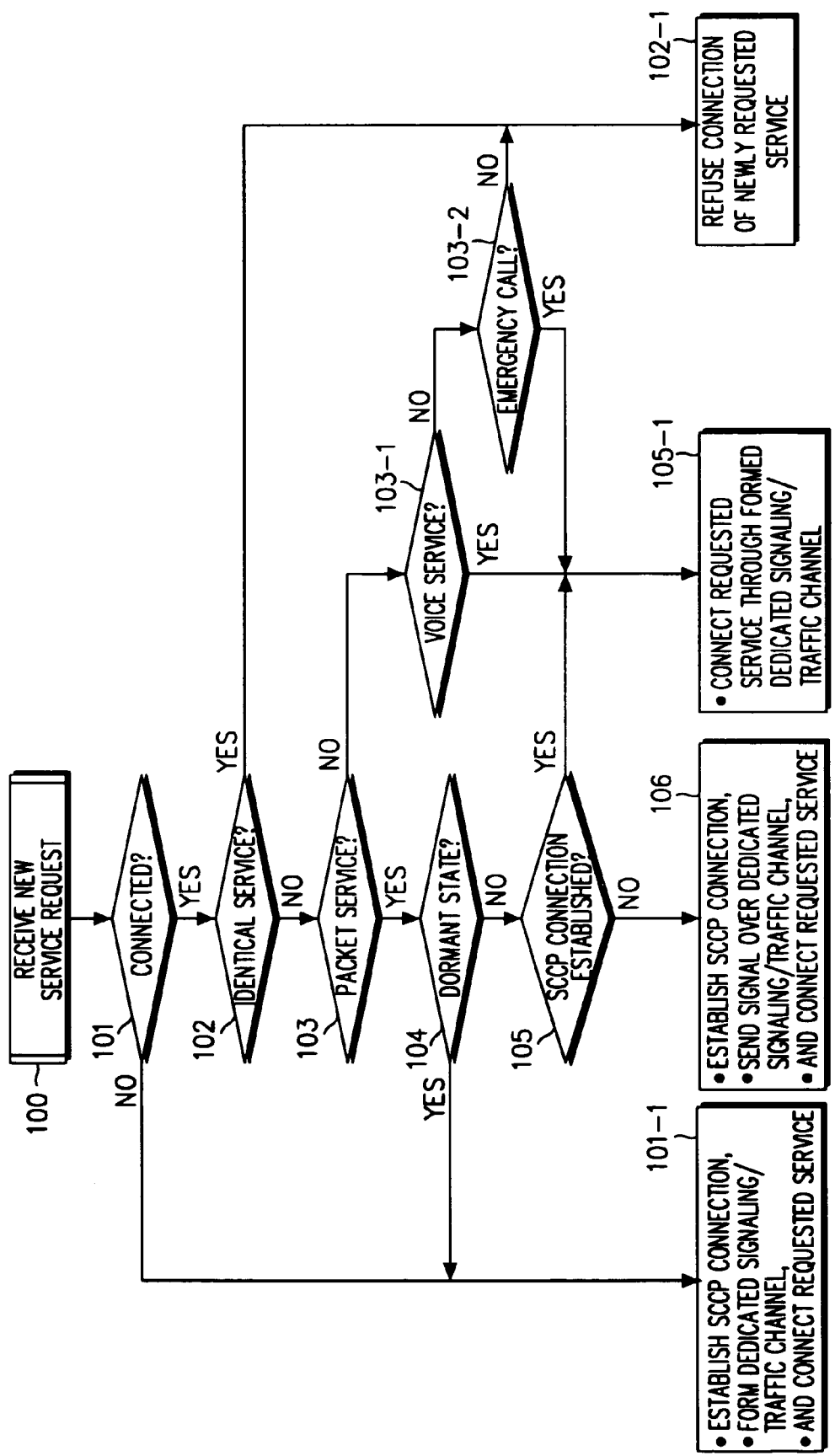
FIG. 4 is a flow chart illustrating a procedure for setting a concurrent service in a mobile communication system according to an embodiment of the present invention.

FIG. 4 illustrates a procedure for setting a concurrent service in a mobile communication system according to an embodiment of the present invention. This procedure is performed in the mobile switching center 10 of FIG. 1. An operation of the mobile switching center 10 will be described in association with the base station 30.

Referring to FIG. 4, upon receipt of a new service request in step 100, the mobile switching center 10 determines in step 101 whether an existing service is connected to the new service-requested mobile station. The new service request may be a voice service request or a packet service request from the base station 30, or a voice service request from an external network via the IWF block 20. The voice service request from the base station 30 is received from the mobile station, and the packet service request is received from the mobile station or the PDSN 60 via the PCF block 50. If it is determined that the existing service is not connected (NO in step 101), the mobile switching center 10 forms a signaling link for assigning a resource to the requested service, between the mobile switching center 10 and the base station 30 in step 101-1. Here, "forming a signaling link" is equivalent to establishing SCCP (Signaling Connection Control Part) connection. In this connection, the base station 30 sends a resource assignment request for the requested service to the mobile switching center 10, and then, the mobile switching center 10 sends a resource assignment approval message to the base station 30 through the signaling link. In addition, in the step 101-1, a dedicated signaling/traffic channel is established for the new service. Subsequently, an operation of connecting the newly requested service is performed. This operation is performed in a known method.

Otherwise, if it is determined that the existing service is connected (YES in step 101), the mobile switching center 10 determines in step 102 whether the newly requested service is identical to the presently connected service by comparing the service option. If the newly requested service is identical to the existing service (YES in step 102), the mobile switching center 10 refuses the connection for the newly requested service in step 102-1.

If it is determined that the newly requested service is not identical to the existing service (NO in step 102), the mobile switching center 10 determines in step 103 whether the existing service is the packet service. If the existing service is the packet service (YES in step 103) and the packet service is in a dormant state (YES in step 104), the mobile switching center 10 proceeds to step 101-1 and performed the aforesaid operation.

If the existing service is the packet service (YES in step 103) and the packet service is in an active state (NO in step 104), the mobile switching center 10 determines in step 105 whether SCCP connection is established between the mobile switching center 10 and the base station 30. If the SCCP connection is established (YES in step 105), resource assignment for the requested service is performed through the SCCP connection existing between the mobile switching center and the base station 30 in step 105-1. Further, in step 105-1, signals are transmitted and received over the dedicated signaling/traffic channel previously assigned to the radio interval and the requested service is connected. If the SCCP connection is not established (NO in step 105), the mobile switching center 10 establishes new SCCP connection between the mobile switching center 10 and the base station 30 in step 106. Further, in step 106, signals are transmitted and received over the dedicated signaling/traffic channel previously assigned to the radio interval and the requested service is connected.

Turning back to step 103, if the existing service is not the packet service (NO in step 103), the mobile switching center 10 determines in step 103-1 whether the existing service is the voice service. If the existing service is the voice service, the mobile switching center 10 proceeds to step 105-1 and performs the aforesaid operation.

If the existing service is neither the packet service (NO in step 103) nor the voice service (NO in step 103-1), the mobile switching center 10 determines in step 103-2 whether the existing service is an emergency call. If the existing service is the emergency call (YES in step 103-2), the mobile switching center 10 proceeds to step 105-1 and performs the aforesaid operation. If the existing service is neither the packet service (NO in step 103), the voice service (NO in step 103-1, nor the emergency call (NO in step 103-2), the mobile switching center 10 proceeds to step 102-1 and refuses connection of the newly requested service.

Figure 5A:
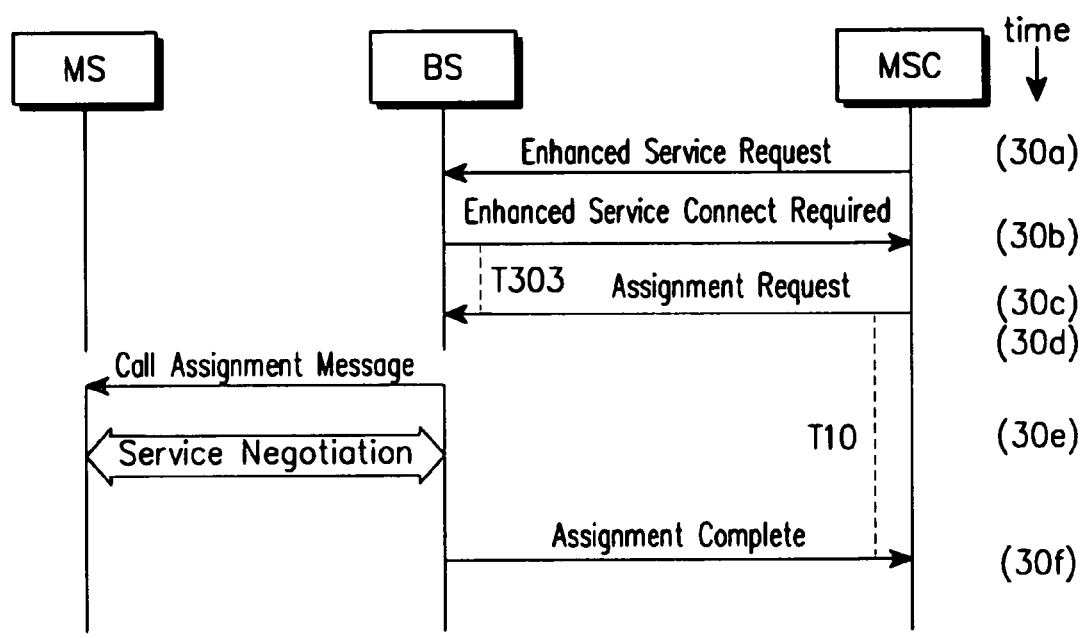
FIGS. 5A to 5C are diagrams illustrating signal flows performed among a mobile switching center, a base station and a mobile station, upon receipt of a new service request while providing an existing service in the mobile communication system according to an embodiment of the present invention.
Figure 5B:
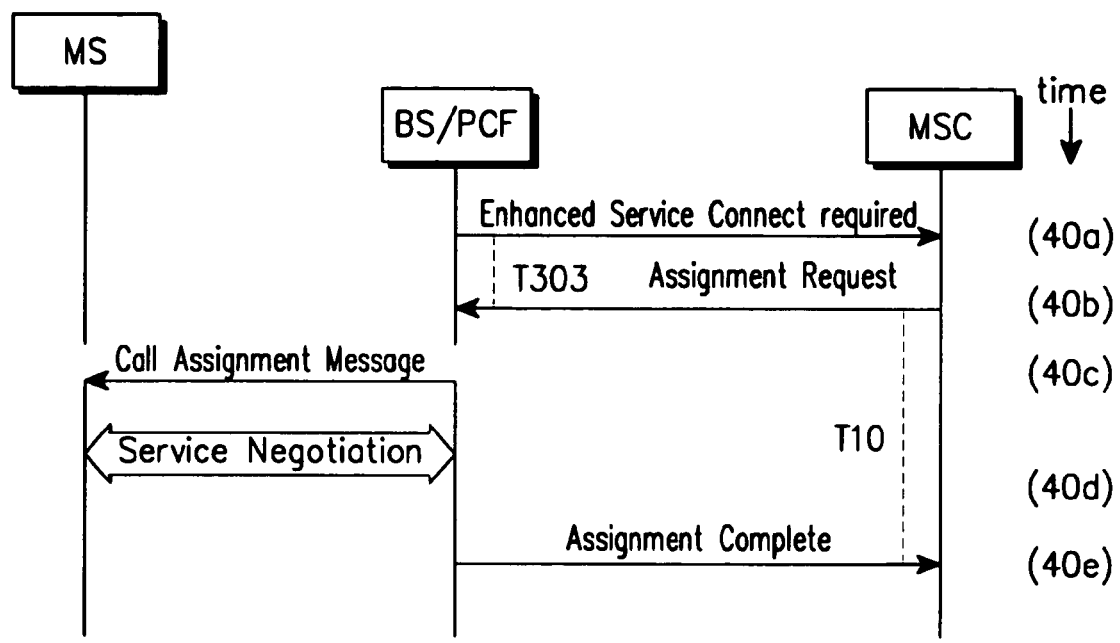

FIGS. 5A and 5B illustrate signal flows performed among the mobile switching center (MSC) 10, the base station (BS) 20 and the mobile station (MS), upon receipt of a new service request while providing an existing service in the mobile communication system according to an embodiment of the present invention.

FIG. 5A illustrates a signal flow performed, upon receipt of a request for adding the voice service while providing the activated packet service in the mobile communication system according to an embodiment of the present invention. This signaling process is applied to a scenario in which the mobile switching center 10 adds the voice service to the existing activated packet service, when it requires new voice service.

Referring to FIG. 5A, if the mobile switching center (MSC) 10 requires new voice service, it sends, in step 30*a*, an enhanced service request message including the newly requested service option, the associated radio resource and a called party's number to the base station (BS) 30, in order to add a new service connect option which is different from the existing service option. A format of the enhanced service request message will be described in detail with reference to FIGS. 6 and 7.

In step 30*b*, in response to the enhanced service request message, the base station 30 generates an enhanced service connect required message, and sends the resource required for setting the newly requested voice service and the related information to the mobile switching center 10 using the generated enhanced service connect required message. A format of the enhanced service connect required message will be described in detail with reference to FIGS. 8, 9A and 9B.

In step 30*c*, the mobile switching center 10 designates (or assigns) a radio resource to be newly added in the radio interval and the associated wire resources based on the information transmitted from the base station 30, and sends an assignment request message according to the designated results to the base station 30. At this moment, the mobile switching center 10 activates a timer T10. Upon receipt of the assignment request message, the base station 30 halts a timer T303.

In step 30d, the base station 30 sends a call assignment message to the mobile station (MS) in order to set a call instance for the service option to be newly added.

In step 30e, a service negotiation is made between the base station 30 and the mobile station. According to the outcome of the service negotiation, the existing service configuration is changed for the newly added service and the radio resource is adjusted to the new service configuration.

In step 30f, the base station 30 sends an assignment complete message to the mobile switching center 10, after completion of connecting the radio resource and the wire for the newly added service.

The signaling process shown in FIG. 5A corresponds to a case where the mobile switching center 10 requires the voice service while providing the packet service. An operation for this case will be described with reference to FIG. 4.

Referring to FIGS. 4 and 5A, upon receipt of a voice service request from the mobile switching center while providing the packet service, i.e., when the mobile switching center 10 requests a voice service addition to the mobile station, the mobile switching center 10 determines whether the signaling link (SCCP connection) is formed between the mobile station center 10 and the base station 30. If the signaling link is not formed, the mobile switching center 10 newly forms the signaling link for the first service between the mobile switching center 10 and the base station 30 (step 106). Next, the mobile switching center 10 sends an enhanced service request to the base station 30 through the previously formed signaling link or the newly formed signaling link (step 30a). In response to the enhanced service request, the base station 30 sends a resource assignment request for the voice service to the mobile switching center 10 through the previously formed signaling link or the newly formed signaling link (step 30b). The mobile switching center 10 then sends a resource assignment approval signal to the base station 30 through the formed signaling link (step 30c). In response to the approval signal, the base station 30 makes a service negotiation for addition of the voice service with the mobile station (steps 30d and 3e).

FIG. 5B illustrates a signal flow performed, upon receipt of a request for adding the packet service while providing the voice service in the mobile communication system according to an embodiment of the present invention. This signaling process is applied to a scenario in which the mobile switching center 10 adds the packet service to the existing activated voice service, when the PDSN 60 of FIG. 1 requests a packet service addition to the mobile station.

Referring to FIG. 5B, upon receipt of a new packet termination request from the PDSN 60 through the PCF block 50, the base station 30 generates an enhanced service connect required message, and sends the resource required for setting the newly requested packet service and the related information to the mobile switching center 10 using the generated enhanced service connect required message, in step 40a. At this moment, the base station 30 activates a timer T303. A format of the enhanced service connect required message will be described in detail with reference to FIGS. 8, 9A and 9B.

In step 40b, the mobile switching center 10 designates (or assigns) a radio resource to be newly added in the radio interval and the associated wire resources based on the information transmitted from the base station 30, and sends an assignment request message according to the designated results to the base station 30. At this moment, the mobile switching center 10 activates a timer T10. Upon receipt of the assignment request message, the base station 30 halts the timer T303.

In step 40c, the base station 30 sends a call assignment message to the mobile station (MS) in order to set a call instance for the service option to be newly added.

In step 40d, a service negotiation is made between the base station 30 and the mobile station. According to the outcome of the service negotiation, the existing service configuration is changed for the newly added service and the radio resource is adjusted to the new service configuration.

In step 40e, the base station 30 sends an assignment complete message to the mobile switching center 10, after completion of connecting the radio resource and the wire for the newly added service.

The signaling process shown in FIG. 5B corresponds to a case where the PDSN 60 requires the voice service while the packet service is being provided. An operation for this case will be described with reference to FIG. 4.

Referring to FIGS. 4 and 5B, at the beginning of the voice service, the signaling link for the voice service has been formed between the base station 30 and the mobile switching center 10. Upon receipt of a packet service request signal from the PDSN 60 while providing the voice service (step 100), the base station 30 sends a resource assignment request for the packet service to the mobile switching center 10 through the formed signaling link (step 40a). In response to the resource assignment request, the mobile switching center 10 sends a resource assignment approval signal to the base station 30 through the formed signaling link (step 40b). In response to the approval signal, the base station 30 makes a service negotiation for addition of the packet service with the mobile station (steps 40c and 40d).

Figure 5C:
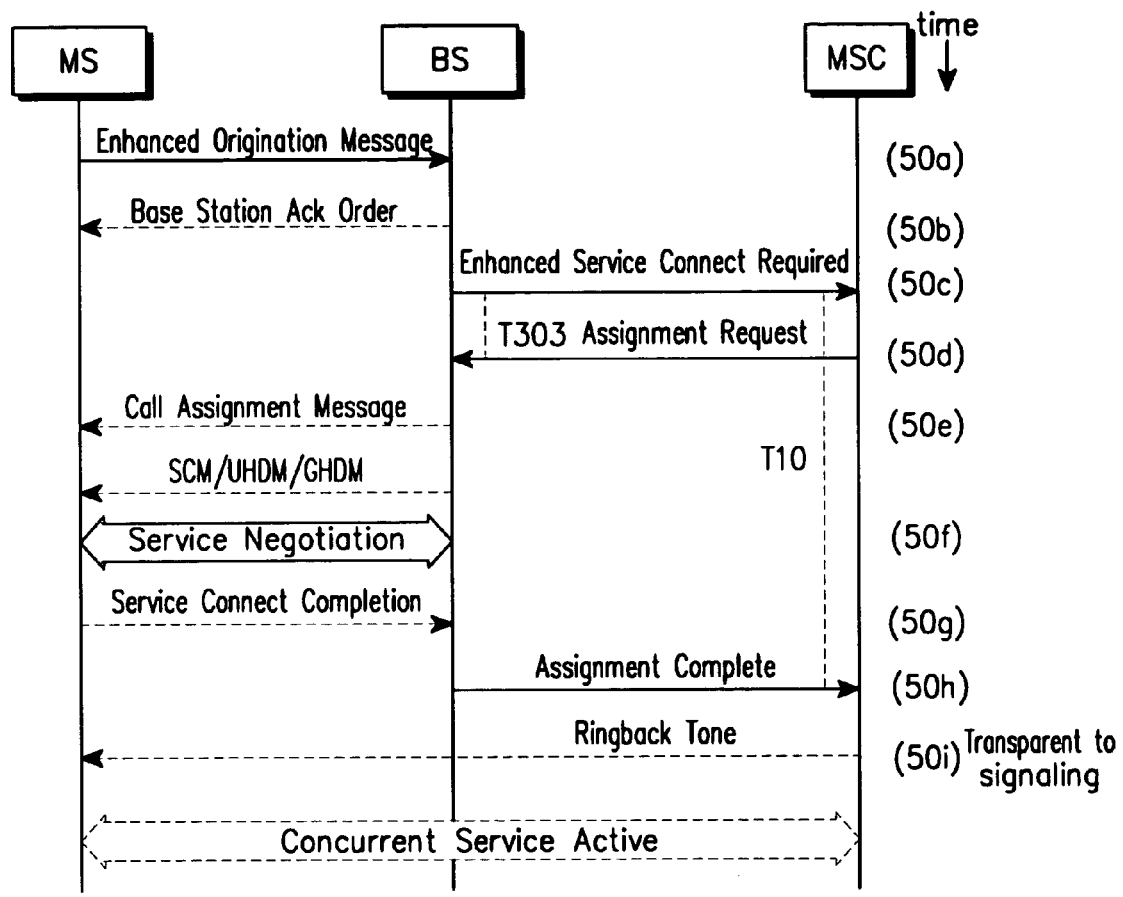

FIG. 5C illustrates a signal flow performed, upon receipt of a request for adding the voice service while providing the activated packet service or a request for adding the packet service while providing the voice service in the mobile communication system according to an embodiment of the present invention. This signaling process is applied to a scenario in which the mobile switching center 10 adds a newly requested service to the existing activated service, upon receipt of a request for adding the voice service or the packet service from the mobile station wirelessly connected to the base station 30.

Referring to FIG. 5C, in step 50a, the mobile station 30 sends an enhanced origination message to the base station over the presently used traffic channel in order to add a new service. At this moment, the mobile station sends a Layer-2 approval request to the base station 30.

In step 50b, the base station 30 sends to the mobile station a Base Station Ack Order message acknowledging receipt of the enhanced origination message.

In step 50c, in response to the enhanced origination message, the base station 30 generates an enhanced service connect required message, and sends the resource required for setting the newly requested service (voice or packet) and the related information to the mobile switching center 10 using the generated enhanced service connect required message. At this moment, the base station 30 activates a timer T303. If origination of a voice call is requested while a packet call is set, the base station 30 may request the mobile switching center 10 to set a preferred terrestrial circuit. A format of the enhanced service connect required message will be described in detail with reference to FIGS. 8, 9A and 9B.

In step 50d, the mobile switching center 10 designates (or assigns) a radio resource to be newly added in the radio interval and the associated wire resources based on the information transmitted from the base station 30, and sends an assignment request message according to the designated results to the base station 30. At this moment, the mobile switching center 10 activates a timer T10. Upon receipt of the assignment request message, the base station 30 halts the timer T303.

In step 50e, the base station 30 sends a call assignment message or SCM (Service Connection Message)/UHDM (Universal Handoff Direction Message)/GHDM (General Handoff Direction Message) to the mobile station in order to set a call instance for the service option to be newly added.

In step 50f, a service negotiation is made between the base station 30 and the mobile station. According to the outcome of the service negotiation, the existing service configuration is changed for the newly added service and the radio resource is adjusted to the new service configuration.

In step 50g, the mobile station 30 sends a service connect completion message to the base station 30, thereby indicating completion of the service negotiation process.

In step 50h, the base station 30 sends an assignment complete message to the mobile switching center 10, after completion of connecting the radio resource and the wire for the newly added service.

In step 50i, in response to the assignment complete message, the mobile switching center 10 sends a ring-back tone to the mobile station via the base station 30.

The signaling process shown in FIG. 5C corresponds to a case where the mobile station requires the packet service (or voice service) while the voice service (or packet service) is being provided. An operation for this case will be described with reference to FIG. 4.

Referring to FIGS. 4 and 5C, the base station 30 receives an origination request for the packet service from the mobile station while providing the voice service (step 50a). In response to the origination request for the packet service, the base station 30 sends a resource assignment request for origination of the packet service through the formed signaling link to provide the voice service between the base station 30 and the mobile switching center 10 (step 50c). The mobile switching center 10 sends a resource assignment approval signal to the base station 30 through the formed signaling link (step 50d). In response to the approval signal, the base station 30 makes a service negotiation for addition of the packet service with the mobile station (steps 50e and 50f).

Meanwhile, in case of requesting a voice service in the mobile station while providing a packet service, in response to an origination request for the voice service, the base station 30 forms a signaling link between the base station 30 and the mobile switching center 10 (step 106). The base station 30 sends a resource assignment request for the voice service to the mobile switching center 10 through the formed signaling link (step 50c). The mobile switching center 10 sends a resource assignment approval signal to the base station 30 through the formed signaling link (step 50d). In response to the approval signal, the base station 30 makes a service negotiation for addition of the voice service with the mobile station (steps 50e and 50f).

Figure 6:
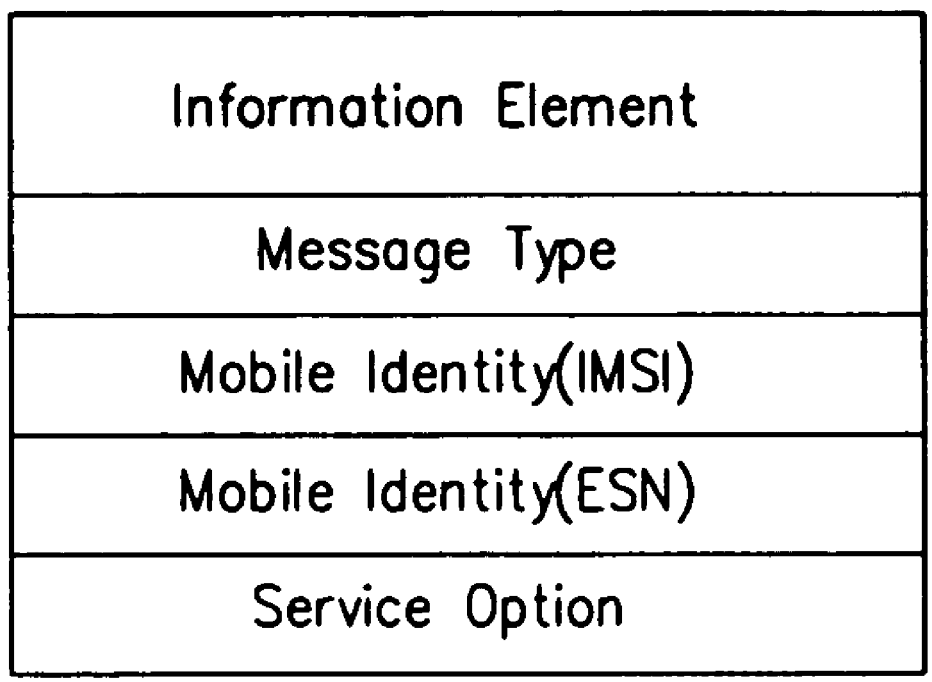
FIG. 6 is a diagram illustrating a format of an enhanced service request message transmitted from the mobile switching center to the base station according to an embodiment of the present invention.

FIG. 6 illustrates a format of the enhanced service request message transmitted from the mobile switching center 10 to the base station 30 according to an embodiment of the present invention.

The enhanced service request message of FIG. 6 is a message transmitted from the mobile switching center 10 to the base station 30 in step 30a of FIG. 5A. That is, this message is a BSMAP (Base Station Mobile Application Part) message, which is be processed in the base station 30 and the mobile switching center 10. The enhanced service request message includes information elements requiring setup of new voice (or packet) in addition to the existing packet (or voice), upon receipt of a new voice termination request from the mobile switching center 10 in a state where the packet is presently activated or upon receipt of a packet termination request from the base station 30 in a state where the voice is presently set. The information elements include Message Type, Mobile Identity (IMSI: International Mobile Subscriber Identifier), Mobile Identity (ESN: Electrical Serial Number), and Service Option. The information elements include the intact information elements existing in the IOS V4.0. Actually, for the mobile identity, either one or both of IMSI and ESN can be used.

FIG. 7 is a table diagram illustrating a bit map layout of the enhanced service request message shown in FIG. 6.

Referring to FIG. 7, the enhanced service request message includes BSMAP Header, Message Type, Mobile Identity (IMSI), Mobile Identity (ESN), and Service Option.

FIG. 8 illustrates a format of the enhanced service connect required message transmitted from the base station 30 to the mobile switching center 10 according to an embodiment of the present invention.

Referring to FIG. 8, the enhanced service connect required message is a message including information elements for wire/wireless resources required in setting the new service option. This message is a DTAP (Direct Transfer Application Part) message transmitted from the base station 30 to the mobile switching center 10. The information elements of the enhanced service connect required message include the intact information elements existing in the IOS V4.0. The information elements include Protocol Discriminator, Reserved-Octet, Message Type, CM Service Type, Mobile Identity (IMSI), Called Party BCD Number, Mobile Identity (ESN), Service Option, Voice Privacy Request, Radio Environment and Resources, Called Party ASCII Number, and Circuit Identity Code.

FIGS. 9A and 9B are table diagrams illustrating a bit map layout of the enhanced service connect required message shown in FIG. 8.

Referring to FIGS. 9A and 9B, the enhanced service connect required message include 3-octet DTAP Header, Protocol Discriminator, Reserved-Octet, Message Type, CM Service Type, Mobile Identity (IMSI), Called Party BCD Number, Mobile Identity (ESN), Service Option, Voice Privacy Request, Radio Environment and Resources, Called Party ASCII Number, and Circuit Identity Code.

B. Concurrent Service Clearing Operation

Figure 10:
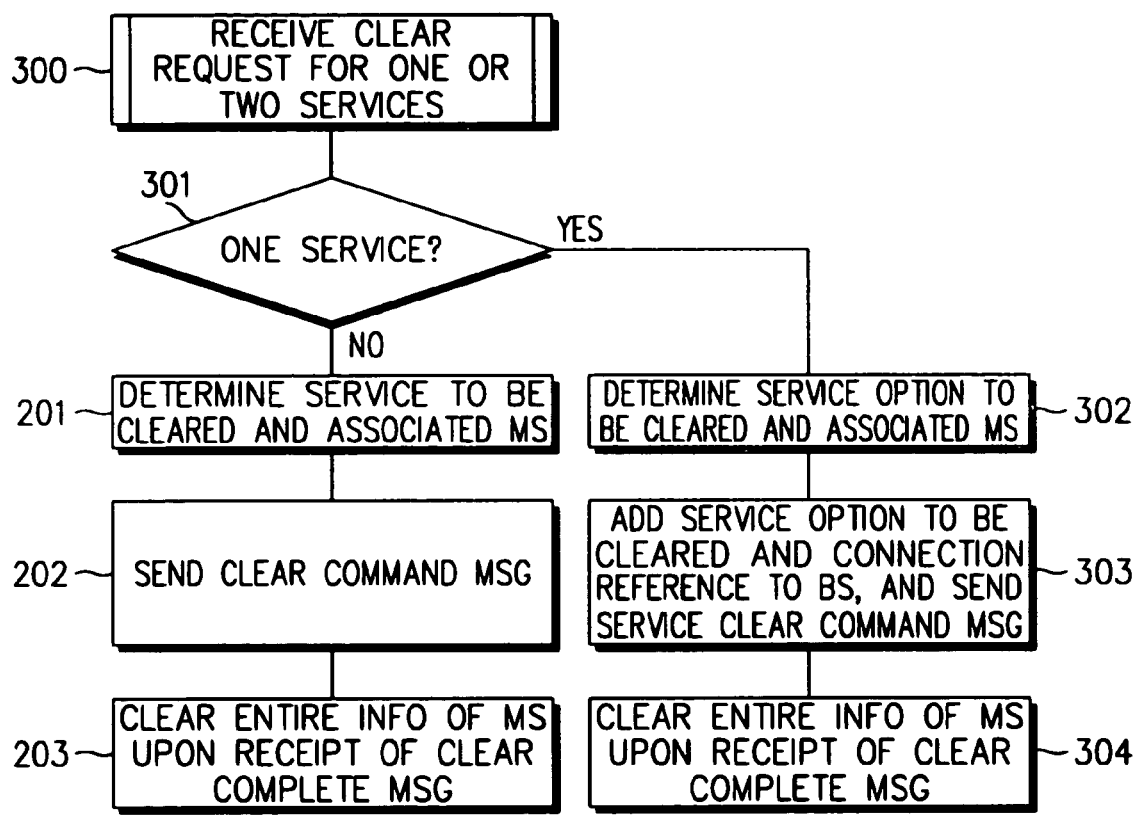
FIG. 10 is a flow chart illustrating a procedure for clearing one service while providing the concurrent service in the mobile communication system according to an embodiment of the present invention.

FIG. 10 illustrates a procedure for clearing one service while providing the concurrent service in the mobile communication system according to an embodiment of the present invention. This procedure is performed in the mobile switching center 10 of FIG. 1. An operation of the mobile switching center 10 will be described in association with the base station 30.

Referring to FIG. 10, upon receipt of a clear request for one or two services (in the embodiment, the two services include every service existing in the corresponding mobile station) from the base station 30 or an external network in step 300, the mobile switching center 10 determines in step 301 whether the number of clear-requested services is one or not. If the number of the clear-requested services is not one, i.e., if the clear-requested services include every service connected to the corresponding mobile station, the mobile switching center 10 performs operations of steps 201, 202, 202-1 and 203.

In step 201, the mobile switching center 10 determines the clear-requested service and the associated mobile terminal. Thereafter, in step 202, the mobile switching center 10 sends to the base station 30 a service clear command message having a command to clear the service of the corresponding mobile station. In addition, the mobile switching center 10 activates a timer T315 in step 202. Upon failure to receive a service clear complete message from the base station 30 in response to the service clear command message within a predetermined time after activation of the timer T315, the mobile switching center 10 repeats the step 202. Here, the number of repetitions can be determined arbitrarily. Upon receipt of the service clear complete message from the base station 30, the mobile switching center 10 clears entire information (i.e., wire connection and service-related entire information) of the corresponding mobile station in step 203. If it is determined that the service clear complete message is received, the mobile switching center 10 halts the timer T315 in step 203. However, upon failure to receive the service clear complete message within a predetermined time after activation of the timer T315, the mobile switching center 10 repeats the operation of step 202.

Meanwhile, if it is determined in step 301 that the number of the services to be cleared is one, the mobile switching center 10 determines the service option to be cleared and also determines the entire wire resources related to the service in step 302. Next, in step 303, the mobile switching center 10 sends to the base station 30 the service clear command message including a command to clear the service of the mobile station. At this point, the mobile switching center 10 designates a cause value in the service clear command message to "Normal Event: A Service Release from the Existing Two Services". In addition, the mobile switching center 10 activates the timer T315 in step 303. Upon failure to receive the service clear complete message from the base station 30 in response to the service clear command message within a predetermined time after activation of the timer T315, the mobile switching center 10 repeats the operation of step 302. Here, the number of repetition is determined arbitrarily.

In step 303-1, if the timer T315 automatically expires before the service clear complete message is received, the mobile switching center 10 sends again the service clear command message. Upon receipt of the service clear complete message from the base station 30, the mobile switching center 10 clears the entire information (wire connection and service-related entire information) of the corresponding mobile station in step 304. If it is determined that the service clear complete message is received, the mobile switching center 10 halts the timer T315 in step 304. However, upon failure to receive the service clear complete message within a predetermined time after activation of the timer T315, the mobile switching center 10 repeats the operation of step 303.

Figure 11A:
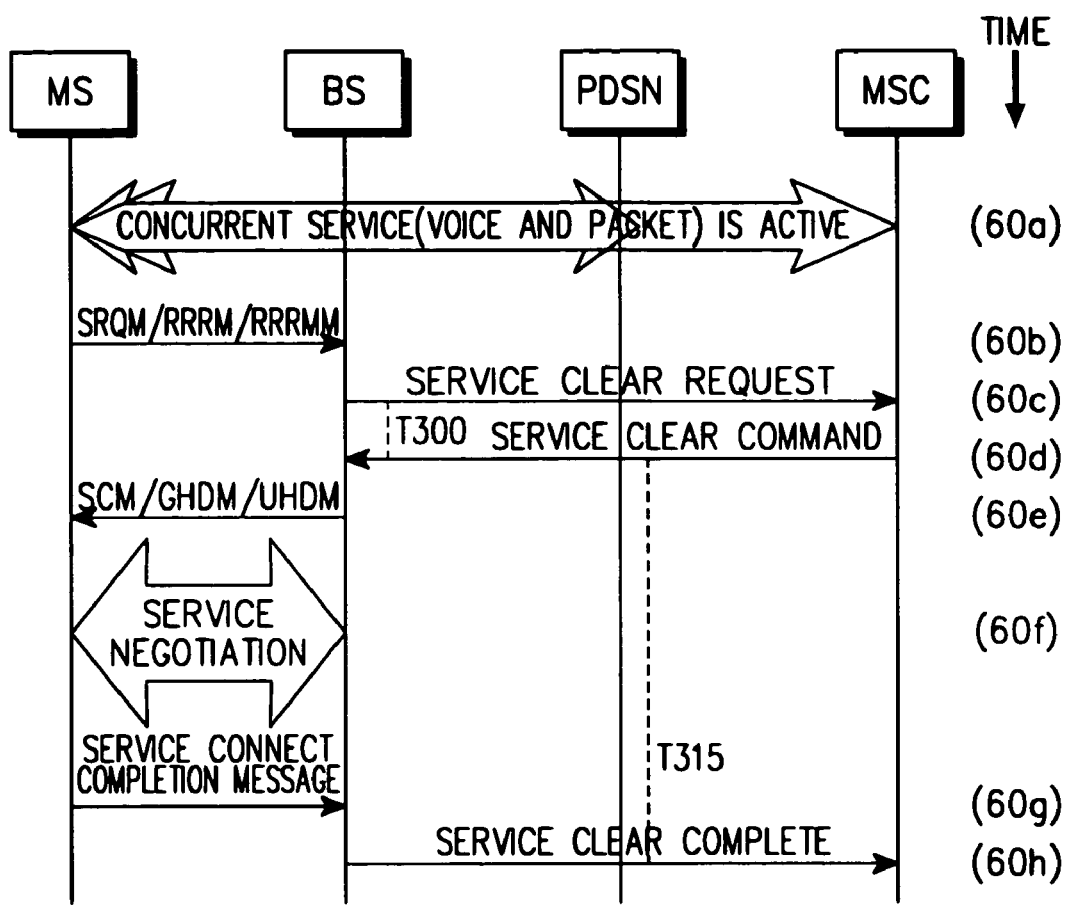
FIGS. 11A to 11C are diagrams illustrating signal flows performed among the mobile switching center, the base station and the mobile station, upon receipt of a service clear request for one service while providing the concurrent service in the mobile communication system according to an embodiment of the present invention.
Figure 11B:
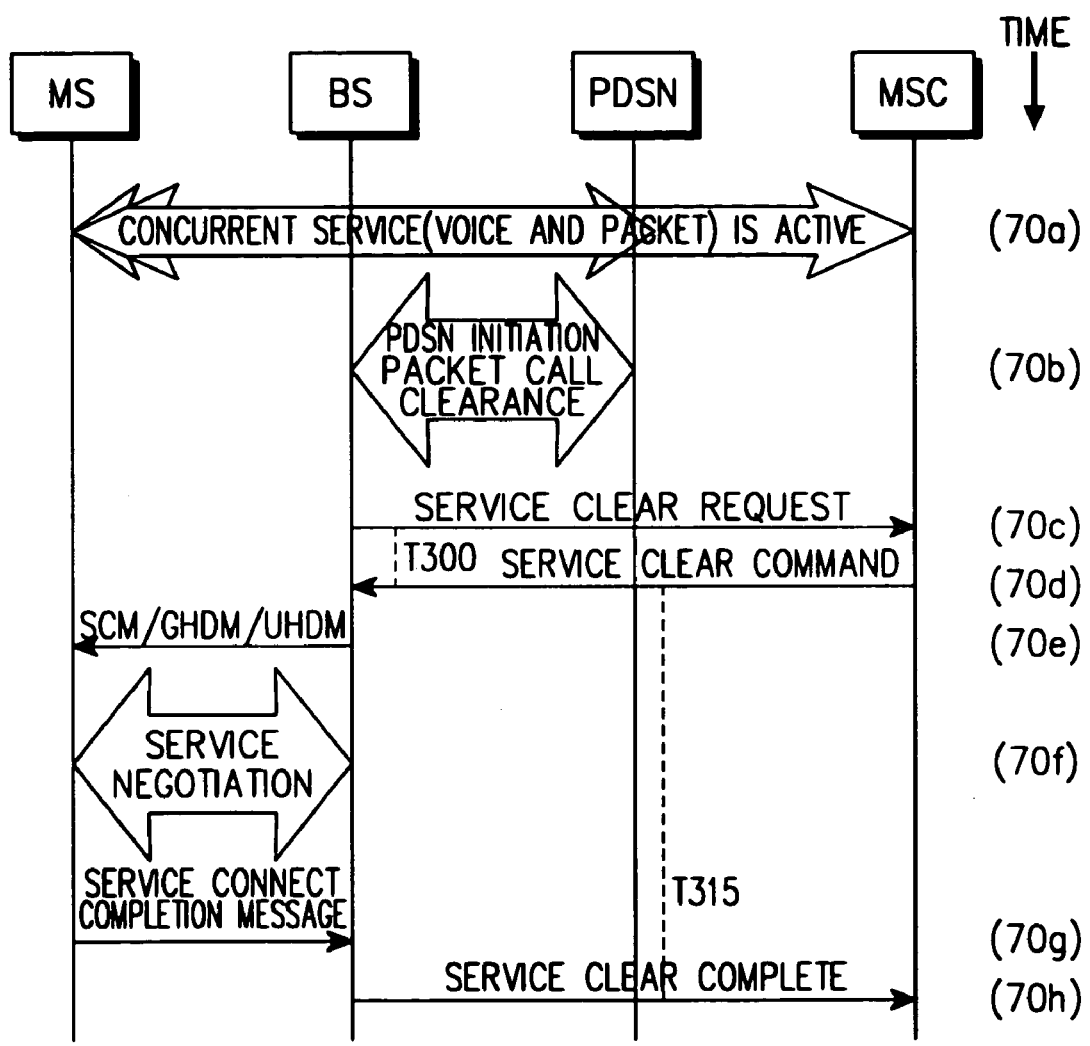
Figure 11C:
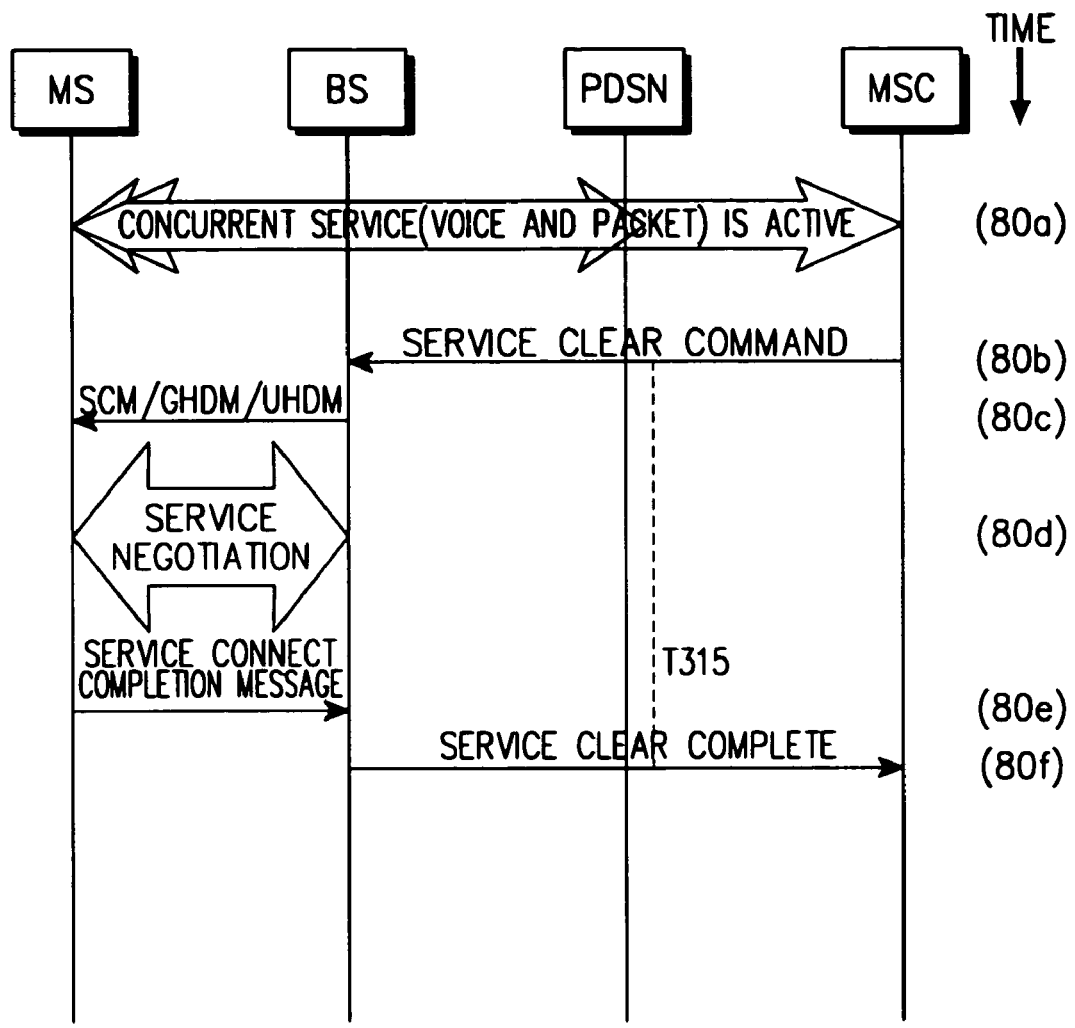

FIGS. 11A to 11C illustrate signal flows performed among the mobile switching center 10, the base station 30, the mobile station and the PDSN 60, upon receipt of a service clear request for one service while providing the concurrent service in the mobile communication system according to an embodiment of the present invention. Herein, as an example of the concurrent service, the packet service is provided between the mobile station (MS) and the PDSN 60, and the voice service is provided between the mobile station and the mobile switching center (MSC).

FIG. 11A illustrates a signal flow performed, upon receipt of a service clear request for one service from the mobile station in a state where two services are connected, in the mobile communication system according to an embodiment of the present invention.

Referring to FIG. 11A, in step 60*a*, two service options (e.g., voice and packet) are presently connected. In step 60*b*, the mobile station 30 sends SRQM (Service ReQuest Message), RRRM (Resource Release Request Message), or RRRMM (Resource Release Request Mini Message) to the base station 30 through a reverse dedicated traffic channel, in order to clear one of the two existing service options. The SRQM, RRRM and RRRMM are messages including the service option to be cleared and the associated radio resource.

In step 60*c*, the base station 30 sends to the mobile switching center 10 a service clear request message including the service option to be cleared and a connection reference associated with the service option. The base station 30 also activates a timer T300.

In step 60*d*, the mobile switching center 10 sends to the base station 30 a service clear command message including the wire resource to be cleared. The mobile switching center 10 also activates a timer T315. In response to the service clear command message, the base station 30 halts the timer T300.

In step 60*e*, the base station 30 clears the wire resource in response to the service clear command message, and sends SCM (Service Connect Message), GHDM (General Handoff Direction Message) or UHDM (Universal Handoff Direction Message) to the mobile station for the service negotiation for a new service configuration changed due to clearance of the service option.

In step 60*f*, upon receipt of SCM/GHDM/UHDM from the base station 30, the mobile station performs a service negotiation for the new service configuration due to clearance of the service option.

In step 60*g*, in response to the SCM/GHDM/UHDM received from the base station 30, the mobile station 30 sends to the base station 30 a service connect completion message indicating the change in the new service configuration due to clearance of the service option.

In step 60*h*, upon receipt of the service connect completion message, the base station 30 sends a service clear complete message to the mobile switching center 10. The mobile switching center 10 then halts a timer T315 and clears the corresponding transmission channel.

The signaling procedure shown in FIG. 11A will be described with reference to FIG. 10.

Referring to FIGS. 10 and 11A, the base station 30 receives a voice service clear request from the mobile station (step 60*b*), while providing the voice service and the packet service (step 60*a*). In response to the voice service clear request, the base station 30 sends a service clear request message to the mobile switching center 10 through a signaling link formed for the voice service (step 60*c*). In response to the service clear request message, the mobile switching center 10 determines the resource assigned for the voice service, and sends information indicating the determined resource to the base station 30 through the signaling link (step 60*d*). Upon receipt of the information, the base station 30 clears the resource assigned for the voice service and the signaling link, and performs a service negotiation for clearance of the voice service with the mobile station (steps 60*e* and 60*f*).

Meanwhile, if the mobile station requests a packet service clearing while concurrently providing a voice service and packet service, the base station 30 may receive a packet service clear request from the mobile station (step 60*b*), while providing the concurrent service of the voice service and the packet service (step 60*a*). In response to the packet service clear request, the base station 30 sends a service clear request message to the mobile switching center 10 through the signaling link formed for the voice service (step 60c). In response to the service clear request message, the mobile switching center 10 determines the resource assigned for the voice service, and sends information indicating the determined resource to the base station 30 through the signaling link (step 60d). Next, upon receipt of the information, the base station 30 clears the resource assigned for the packet service, and performs a service negotiation for clearance of the packet service with the mobile station (steps 60e and 60f). At this point, even though the packet service is cleared, the formed signaling link is maintained for the voice service.

FIG. 11B illustrates a signal flow performed, upon receipt of a packet service clear request from the PDSN 60 in a state where two services are connected, in the mobile communication system according to an embodiment of the present invention.

Referring to FIG. 11B, in step 70a, two service options (e.g., voice and packet) are presently connected. In step 70b, a packet service clear request is initiated by the PDSN 60 and the corresponding packet service clearance process is performed between the base station 30 and the PDSN 60.

In step 70c, the base station 30 sends to the mobile switching center 10 a service clear request message including the service option to be cleared and a connection reference associated with the service option. The base station 30 also activates a timer T300.

In step 70d, the mobile switching center 10 sends to the base station 30 a service clear command message including the wire resource to be cleared. The mobile switching center 10 also activates a timer T315. In response to the service clear command message, the base station 30 halts the timer T300.

In step 70e, the base station 30 clears the wire resource in response to the service clear command message, and sends SCM (Service Connect Message), GHDM (General Handoff Direction Message) or UHDM (Universal Handoff Direction Message) to the mobile station for the service negotiation for a new service configuration changed due to clearance of the service option.

In step 70f, upon receipt of SCM/GHDM/UHDM from the base station 30, the mobile station performs a service negotiation for the new service configuration due to clearance of the service option.

In step 70g, in response to the SCM/GHDM/UHDM received from the base station 30, the mobile station 30 sends to the base station 30 a service connect completion message indicating the change in the new service configuration due to clearance of the service option.

In step 70h, upon receipt of the service connect completion message, the base station 30 sends a service clear complete message to the mobile switching center 10. The mobile switching center 10 then halts a timer T315 and clears the corresponding transmission channel.

The signaling procedure shown in FIG. 11B will be described with reference to FIG. 10.

Referring to FIGS. 10 and 11B, the base station 30 receives a packet service clear request from the PDSN 60 (step 70b), while providing the voice service and the packet service (step 70a). In response to the packet service clear request, the base station 30 sends a service clear request message to the mobile switching center 10 through a signaling link formed for the voice service (step 70c). In response to the service clear request message, the mobile switching center 10 determines the resource assigned for the voice service, and sends information indicating the determined resource to the base station 30 through the signaling link (step 70d). Upon receipt of the information, the base station 30 clears the resource assigned for the packet service, and performs a service negotiation for clearance of the packet service with the mobile station (steps 70e and 70f). At this point, even though the packet service is cleared, the formed signaling link is maintained for the voice service.

FIG. 11C illustrates a signal flow performed, upon receipt of a voice service clear request from the mobile switching center 10 in a state where two services are connected, in the mobile communication system according to an embodiment of the present invention.

Referring to FIG. 11C, in step 80a, two service options (e.g., voice and packet) are presently connected. In step 80b, the mobile switching center 10 sends a service clear command message including the wire resource to be cleared to the base station 30. The mobile switching center 10 also activates a timer T315.

In step 80c, in response to the service clear command message, the base station 30 clears the wire resource and sends SCM: (Service Connect Message), GHDM (General Handoff Direction Message) or UHDM (Universal Handoff Direction Message) to the mobile station for the service negotiation for a new service configuration changed due to clearance of the service option.

In step 80d, upon receipt of SCM/GHDM/UHDM from the base station 30, the mobile station performs a service negotiation for the new service configuration due to clearance of the service option.

In step 80e, in response to the SCM/GHDM/UHDM received from the base station 30, the mobile station 30 sends to the base station 30 a service connect completion message indicating the change in the new service configuration due to clearance of the service option.

In step 80f, upon receipt of the service connect completion message, the base station 30 sends a service clear complete message to the mobile switching center 10. The mobile switching center 10 then halts a timer T315 and clears the corresponding transmission channel.

The signaling procedure shown in FIG. 11C will be described with reference to FIG. 10.

Referring to FIGS. 10 and 11C, while providing the concurrent service of the voice service and the packet service (step 80a), the mobile switching center 10 determines the resource assigned for the voice service and sends information indicating the determined resource through the signaling link formed for the voice service, in order to clear the voice service (step 80b). Upon receipt of the information, the base station 30 clears the resource assigned for the voice service, and performs a service negotiation for clearance of the voice service with the mobile station (steps 80c and 80d).

FIG. 12 illustrates a format of the service clear request message transmitted from the base station 30 to the mobile switching center 10 according to an embodiment of the present invention.

Referring to FIG. 12, information elements of the service clear request message include Message Type, Cause, Service Option Connection Reference, and Cause Layer 3. The service clear request message with the above information fields is a BSMAP (Base Station Mobile Application Part) message, and the base station 30 sends the service clear request message to the mobile switching center 10, thereby indicating the related dedicated resource that the base station 30 desires to clear. The service clear request message is transmitted through connection of BSMAP and SCCP (Signaling Connection Control Part), related to the dedicated resource.

FIGS. 13A and 13B are table diagrams illustrating a bit map layout of the service clear request message shown in FIG. 12.

Referring to FIGS. 13A and 13B, the service clear request message includes BSMAP Header area, Message Type area, Cause area, Call Service Option Connection Reference area, and Cause Layer 3 area. The BSMAP Header area includes Message Discrimination field and Length Indicator field. The Cause area includes A1 Element Identifier field, Length field, and Cause Value field. The Service Option Connection Reference area includes A1 Element Identifier field, Length field, Reserved field, Service Option 1 field, and Service Option 1 Connection Reference field. The Cause Layer 3 area includes A1 Element Identifier field, Length field, Coding Standard field, Reserved field, Location field, and Cause Value field.

FIG. 14 illustrates a format of the service clear command message transmitted from the mobile switching center to the base station 30 according to an embodiment of the present invention.

Referring to FIG. 14, the service clear command message is a BSMAP message transmitted from the mobile switching center 10 to the base station 30 to indicate the base station 30 which will clear the related dedicated resource. The service clear command message is transmitted through connection of BSMAP and SCCP (Signaling Connection Control Part), related to the dedicated resource. The information elements of the service clear command message include Message Type, Cause, Service Option Connection Reference, and Cause Layer 3.

FIGS. 15A and 15B are table diagrams illustrating a bit map layout of the service clear command message shown in FIG. 14.

Referring to FIGS. 15A and 15B, the service clear command message includes BSMAP Header area, Message Type area, Cause area, Service Option Connection Reference area, and Cause Layer 3 area. The BSMAP Header area includes Message Discrimination field, and Length Indicator field. The Cause area includes A1 Element Identifier field, Length field, and Cause Value field. The Service Option Connection Reference area includes A1 Element Identifier field, Length field, Reserved field, Service Option 1 field, and Service Option 1 Connection Reference field. The Cause Layer 3 area includes A1 Element Identifier field, Length field, Coding Standard field, Reserved field, Location field, and Cause Value field.

The service clear request message and the service clear command message shown in FIGS. 13 and 14 are the signaling messages exchanged between the mobile switching center 10 and the base station 30 to clear one service while the two services are connected.

Figures 16, 17:
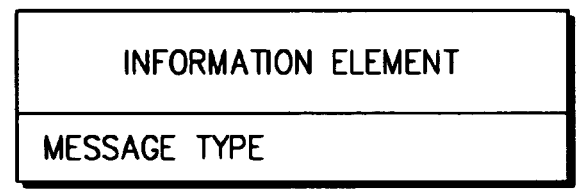
FIG. 16 is a diagram illustrating a format of a service clear complete message transmitted from the base station to the mobile switching center according to an embodiment of the present invention.
FIG. 17 is a table diagram illustrating a bit map layout of the service clear complete message shown in FIG. 16.

FIG. 16 illustrates a format of the service clear complete message transmitted from the base station 30 to the mobile switching center 10 according to an embodiment of the present invention.

Referring to FIG. 16, the service clear complete message is a BSMAP message transmitted from the base station 30 to the mobile switching center 10, and indicates successful clearance of the dedicated resource associated with specific service option reference. This service clear complete message includes an information element of Message Type.

FIG. 17 is a table diagram illustrating a bit map layout of the service clear complete message shown in FIG. 16.

Referring to FIG. 17, the service clear complete message includes BSMAP Header area and Message Type area. The Header area includes Message Discrimination field and Length Indicator field.

As described above, the mobile communication system according to an embodiment of the present invention can support the concurrent service by adding a new service to an exiting service. The mobile communication system can also clear one service during the concurrent service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for concurrently providing a first service between a mobile station and a mobile switching center (MSC) and a second service between the mobile station and a packet data service network (PDSN) in a mobile communication system including the mobile station, a base station in communication with the mobile station, the MSC connected to the base station, and the PDSN connected to the base station, the method comprising the steps of:

forming, in the base station, a signaling link for the first service between the base station and the MSC;

receiving, in the base station, a service request signal for the second service from the PDSN while providing the first service;

upon receipt of the service request signal for the second service, sending, from the base station, a resource assignment request for the second service to the MSC through the formed signaling link, wherein the second service is a voice service or a packet service; and receiving, by the base station, a resource assignment approval signal from the MSC through the formed signaling link, wherein the MSC determines whether the newly requested second service is identical to the presently connected first service by comparing a service option.

2. The method as claimed in claim 1, further comprising the step of making a service negotiation for addition of the second service between the base station and the mobile station in response to the resource assignment approval signal.

3. A method for concurrently providing a first service between a mobile station and an MSC and a second service between the mobile station and a PDSN in a mobile communication system including the mobile station, a base station in communication with the mobile station, the MSC connected to the base station, and the PDSN connected to the base station, the method comprising the steps of:

upon receipt of a service request for the first service from the MSC to the mobile station while providing the second service, receiving, by the base station, a concurrent service request based on the service request of the first service from the MSC through a previously or newly formed signaling link between the base station and the MSC, wherein the second service is a voice service or a packet service;

in response to the concurrent service request, sending in the base station a resource assignment request for the first service to the MSC through the formed signaling link; and receiving, by the base station, a resource assignment approval signal from the MSC through the formed signaling link, wherein the MSC determines whether the newly requested second service is identical to the presently connected first service by comparing a service option.

4. The method as claimed in claim 3, further comprising the step of making a service negotiation for addition of the first service between the base station and the mobile station in response to the resource assignment approval signal.

5. A method for concurrently providing a first service between a mobile station and an MSC and a second service between the mobile station and a PDSN in a mobile communication system including the mobile station, a base station in communication with the mobile station, the MSC connected to the base station, and the PDSN connected to the base station, the method comprising the steps of:

receiving in the base station an origination request for the second service from the mobile station while providing the first service;

in response to the origination request, sending from the base station to the MSC a resource assignment request for origination of a new service through a signaling link formed to provide the first service between the base station and the MSC, wherein the second service is a voice service or a packet service; and receiving, by the base station, a resource assignment approval signal from the MSC through the formed signaling link, wherein the MSC determines whether the newly requested second service is identical to the presently connected first service by comparing a service option.

6. The method as claimed in claim 5, further comprising the step of making a service negotiation for addition of the second service between the base station and the mobile station in response to the resource assignment approval signal.

7. A method for concurrently providing a first service between a mobile station and an MSC and a second service between the mobile station and a PDSN in a mobile communication system including the mobile station, a base station in communication with the mobile station, the MSC connected to the base station, and the PDSN connected to the base station, the method comprising the steps of:

receiving in the base station an origination request for the first service from the mobile station while providing the second service;

in response to the origination request, forming in the base station a signaling link between the base station and the MSC;

sending in the base station a resource assignment request for the first service to the MSC through the formed signaling link, wherein the second service is a voice service or a packet service; and receiving, by the base station, a resource assignment approval signal from the MSC through the formed signaling link, wherein the MSC determines whether the newly requested second service is identical to the presently connected first service by comparing a service option.

8. The method as claimed in claim 7, further comprising the step of making a service negotiation for addition of the first service between the base station and the mobile station in response to the resource assignment approval signal.

* * * * *